No. 728,920. Patented May 26, 1903.

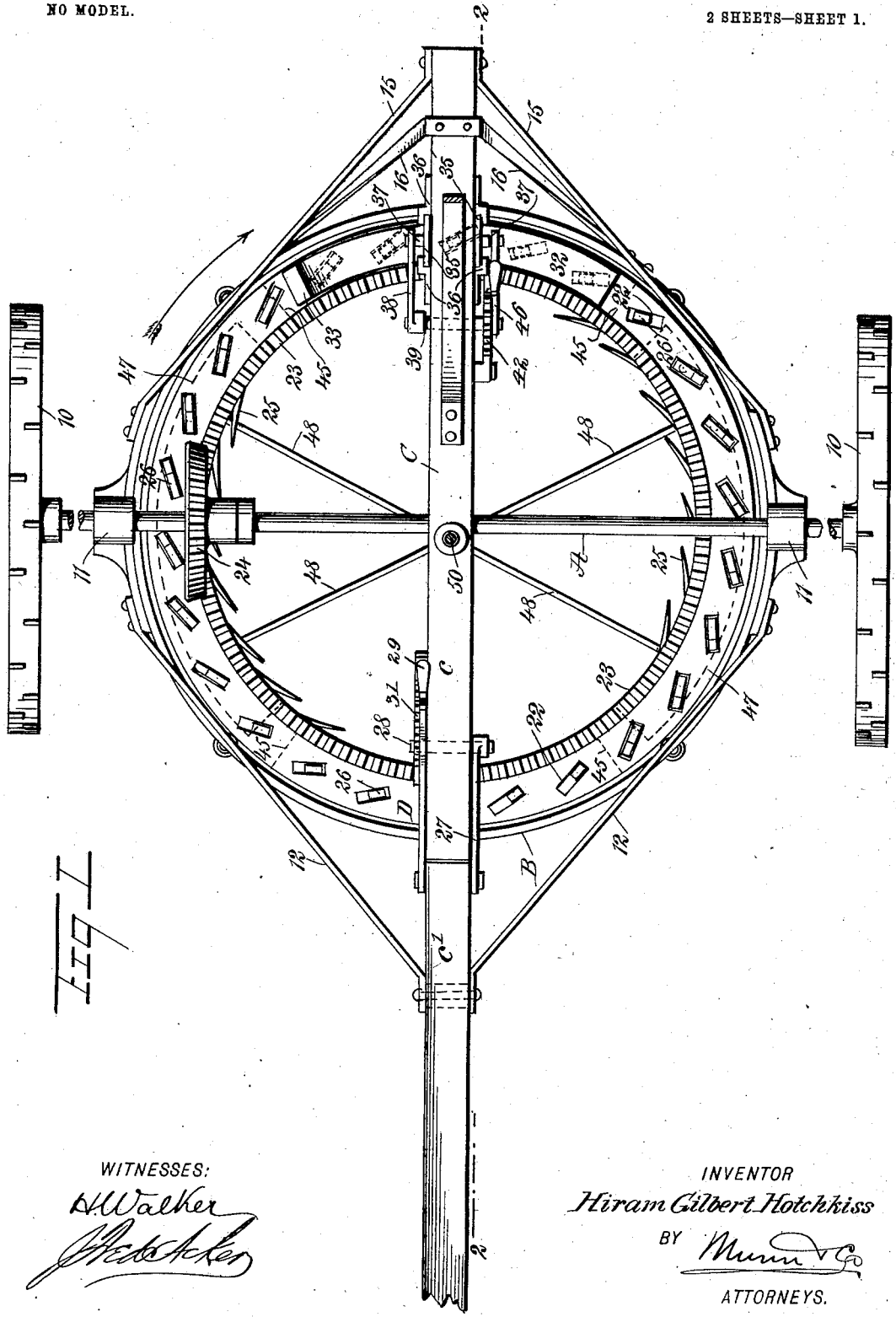

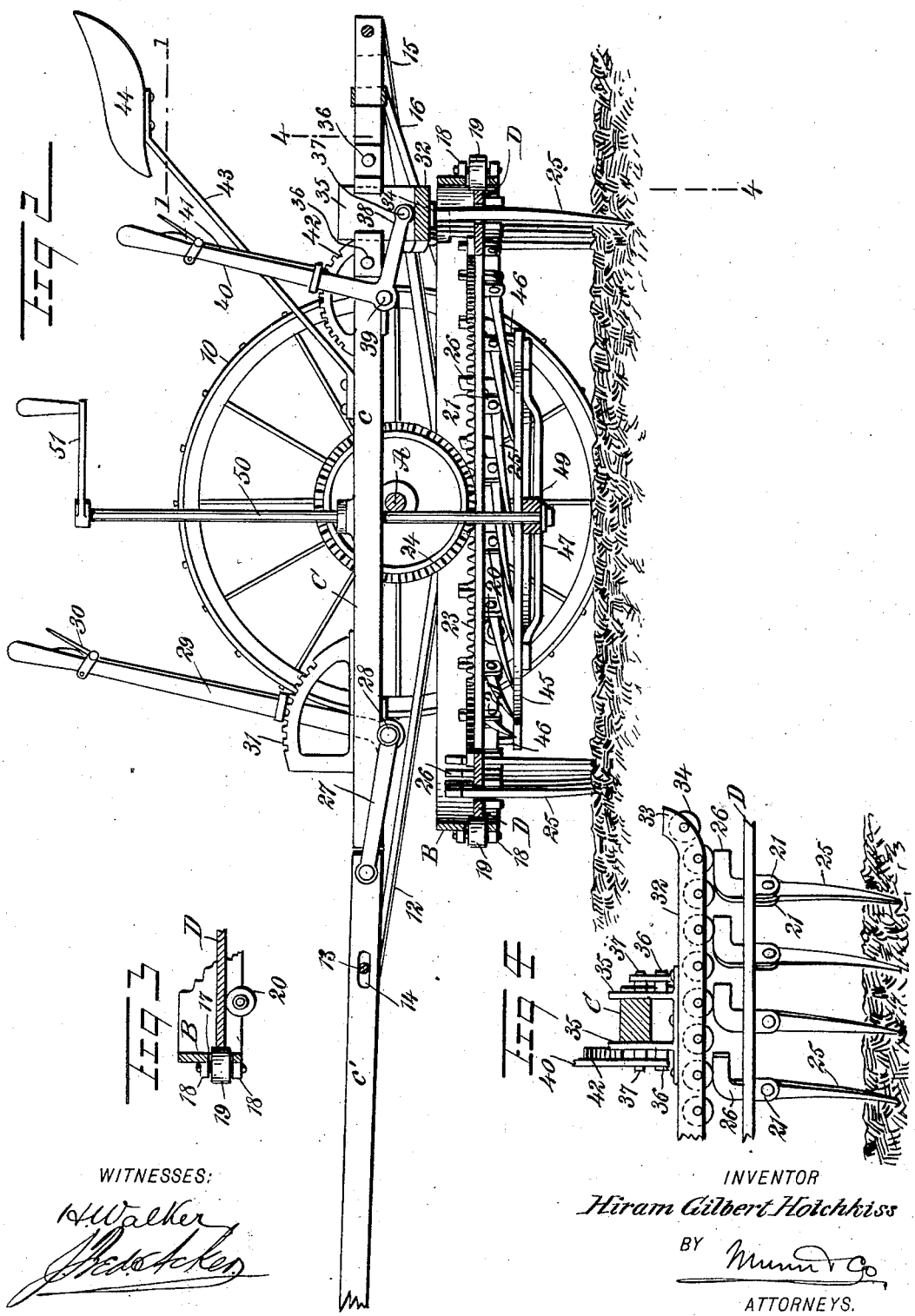

UNITED STATES PATENT OFFICE.

HIRAM GILBERT HOTCHKISS, OF LYONS, NEW YORK.

MACHINE FOR PULLING BEETS.

SPECIFICATION forming part of Letters Patent No. 728,920, dated May 26, 1903.

Application filed August 9, 1902. Serial No. 119,071. (No model.)

*To all whom it may concern:*

Be it known that I, HIRAM GILBERT HOTCHKISS, a citizen of the United States, and a resident of Lyons, in the county of Wayne and State of New York, have invented a new and Improved Machine for Pulling Beets, of which the following is a full, clear, and exact description.

The purpose of my invention is to provide a simple, durable, and economic machine for pulling beets, adapted especially to be used in connection with a topping-machine, but which may be used independently of a topping-machine, as desired, and to so construct the improved machine that a series of teeth will be pivoted upon a circular rotatable support and controlled in such manner that as the machine advances the forward teeth will trail upon the ground and drag the severed beet-tops to the side next the adjoining row, whereupon the teeth are raised from the ground and are held elevated until they reach the rear of the machine, at which point they enter the ground under the influence of a regulating device and in their circular movement throw or pull the beets out of position in the row, carrying them forward and to the right, leaving the beets after they are pulled on the surface of the ground between the rows in a clean condition, where they can be expeditiously and conveniently gathered up.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine, the seat-standard being sectioned on the line 1 1 of Fig. 2. Fig. 2 is a vertical longitudinal section on the line 2 2 of Fig. 1. Fig. 3 is a detail vertical section through a portion of the main frame and tooth-carrying ring supported in said frame, and Fig. 4 is a vertical section taken practically on the line 4 4 of Fig. 2.

A represents an axle provided at its ends with suitable supporting-wheels 10, and B represents a band or ring-like frame, which is supported from the axle A by hangers 11, through which the axle passes loosely.

C represents a pole or tongue which is in two sections $c$ and $c'$, the section $c$ extending over the said ring or band frame B from front to rear and the section $c'$ being that portion of the tongue or pole to which the draft-animals are attached. These sections of the tongue or pole are connected in a manner to be hereinafter described, and the forward section $c'$ of the tongue or pole is connected with the forward portions of the hangers 11 by forwardly-extending braces 12, which braces at their forward ends are connected by a pin 13, passed through a suitable slot 14 in the front section $c'$ of the tongue. The rear section $c$ of the said tongue is braced and held in position by rods 15, secured to its rear portion at the sides and to the rearwardly-extending portions of the hangers 11, while other brace-rods 16 are secured to the tongue or pole near its rear end and to the main band-frame B, as is shown best in Fig. 1.

The main band-frame B is provided at its sides with any desired number of openings 17, (shown in Fig. 3,) and from the outer surface of the main band-frame B lugs 18 are horizontally extended, in which lugs the trunnions or friction-rollers 19 are mounted to turn, and said rollers extend through the openings 17 into the main band-frame, as is shown in both Figs. 2 and 3. The rollers 19 are horizontally placed; but a second series of vertically-placed rollers 20 are employed, suitably mounted at the lower portion of the inner side surface of the main band-frame B, as is likewise shown in Fig. 3.

A ring D is supported in the band-frame B by the vertically-disposed rollers 20, and the periphery of the ring D is in engagement with the horizontally-disposed rollers 19, so that the said ring D may freely turn in the main frame B of the machine.

Series of openings or slots 22 are produced in the said ring D, preferably obliquely, as shown in Fig. 1, and upon the upper surface of the ring D, at its inner edge, bevel-teeth 23 are produced, adapted to mesh with the teeth of a bevel-gear 24, secured on the axle A, whereby to impart rotary movement to the said ring. This ring is provided with downwardly-extending ears 21 at each side of the openings or apertures 22 therein, and between the ears or lugs 21 teeth 25 are pivoted, as is shown best in Fig. 4. These teeth are more or less tapering, approaching a point at their lower ends, and may be more or less curved, or they may be straight. The said teeth 25 extend through the slots or openings 22 to a point above the upper surface of the ring D, and at the upper end of each tooth a head 26 is formed which is at an angle to the main or body portion of the tooth, as is also best shown in Fig. 4.

The frame B and tooth-carrying ring D are raised and lowered, as may be found desirable, by raising and lowering the rear section c of the tongue or pole C. This is accomplished by pivoting links 27 to the rear end of the forward pole-section c' and connecting the rear ends of the links 27 by a shaft 28, suitably journaled below the rear section c of the pole, as is shown in Figs. 1 and 2, and at one end of the said shaft 28 a lever 29 is secured, provided with the usual thumb-latch 30 to engage with notches in a segmental rack 31, carried by the rear section c of the pole.

When the teeth 25 reach the rear portion of the machine, they are held more or less straight and are therefore adapted to enter the ground to a greater or less extent through the medium of an adjustable upper rail 32, with which the heads 26 of the teeth are adapted to engage at the rear of the machine. This upper rail 32 is consequently located at the central rear portion of the machine above and independent of the main band-frame B, and the right-hand end 33 of this upper or adjusting rail 32 is more or less upwardly curved. In the bottom surface of the adjusting-rail 32 any desired number of friction-rollers 34 are mounted to turn, so that the teeth will be subjected to the least possible amount of friction when acted upon by the said adjusting-rail.

The adjusting-rail 32 has vertical movement to and from the main frame D and is guided in such movement by plates 35, which extend upward from the said rail at its central portion, one at each side of the rear section c of the pole, and these plates 35 slide in guides 36, secured to the sides of the pole, as is clearly shown in Figs. 1 and 4, and trunnions 37 extend outward from the said plates 35. Each trunnion is pivotally connected with a link 38, and these links are connected at their forward ends by a shaft 39, suitably journaled in bearings attached to the under surface of the pole C, as is shown in Fig. 2. One link 38—the left-hand link, for example—is integral with a lever 40, which extends upward and is provided with a thumb-latch 41, adapted to enter the teeth of a rack 42, carried by the said pole or tongue, so that by the manipulation of the lever 40 the regulating or adjusting rail 32 may be raised or lowered, as desired.

When the teeth are at the front of the machine, they enter the ground, their vertical position being assumed through gravity, and the teeth at the front of the machine practically trail upon the ground and at such point are adapted to engage with the severed tops of the beets to carry the said tops to one side of the machine. As each tooth at the front of the machine accomplishes this result it is adapted to be raised from the surface of the ground and supported in its elevated position, and the said teeth occupy their raised position at both sides of the machine or at points intermediate of the front and the rear. The teeth are supported above the ground at the sides of the machine by segmental tracks 45, with which they engage and upon the upper surface of which they ride. These tracks are secured to the under surface of the main frame B by suitable posts 46, as is shown best in Fig. 2, the said tracks being likewise shown in dotted lines in Fig. 1.

When the teeth approach the rear portion of the machine, they are under the influence of the adjusting-rail 32 and, as stated, are made to enter the ground in more or less of a vertical position. In thus entering the ground they throw the beets out from their positions in a row to a point between the rows, but in a contrary direction to the direction in which the tops were thrown, so that the pulled beets are carried away from their severed tops, and the tops can be readily gathered up separately, lying in windrows, as it were, and the beets can be picked up in a very clean condition, as they will lie in substantially regular order on the ground between the rows in which they were planted.

It is desirable to have all of the teeth of the machine elevated when the machine is being carried to or from the field of action. This is accomplished by locating auxiliary segmental rails 47 below the fixed rails 45 and connecting the auxiliary rails by rods 48, which at their junction have a hub 49 formed thereon, as is shown in Fig. 2, and the lower end of a vertical shaft 50 is secured to the said hub 49, the shaft being passed out through suitable bearings in the rear section c of the pole, as is best shown in Fig. 2, and at the upper end of the shaft 50 a crank-arm 51 is attached, so that when it is desired to raise all of the teeth the auxiliary and segmental tracks 47 are turned, through the medium of the shaft 50, in such manner that they will overlap the ends of the fixed tracks 45, thus making virtually a continuous track on which the teeth will rest. When the machine arrives at the place of operation, it is simply necessary to carry the auxiliary tracks to their normal position beneath the main tracks, and at such time the front and rear teeth will drop to their working position.

Having thus described my invention, I claim as new and desire to secure by Letters Patent—

1. In a machine for pulling beets, a horizontal revoluble support, pivoted teeth carried by the support and adapted to trail upon the ground at the front of the machine, means for raising the teeth from the ground at the sides of the machine, and means for locking the teeth from swinging movement when at the rear of the machine, to cause them to enter the ground, as set forth.

2. In a machine for pulling beets, a frame, a ring mounted to revolve horizontally in the said frame, teeth pivotally carried by the ring, and means for automatically raising the teeth at the side portions of the frame, as described.

3. In a machine for pulling beets, a wheel-supported frame, a revoluble ring supported in the said frame, teeth pivotally carried by the said ring, devices carried by the frame for automatically carrying the teeth at the sides of the frame from engagement with the ground, and means, substantially as described, for regulating the depth at which the rear teeth shall enter the ground and for holding the said rear teeth stationary for a portion of their travel, as set forth.

4. In a machine for pulling beets, a wheel-supported frame, a ring mounted to turn in the said frame, teeth pivotally attached to the frame and adapted to extend downward therefrom, rails carried by the frame at its sides, whereby to hold the side teeth in an elevated position, and an adjustable rail located above the rear portion of the frame and adapted for engagement with the upper ends of the rear teeth of the said ring, for the purpose set forth.

5. In a machine for pulling beets, a frame, a ring mounted to turn in the frame, teeth pivotally carried by the ring, stationary rails located at the sides of the frame, adapted to hold the side teeth in an elevated position, and auxiliary movable rails supported below the stationary rails and adapted to connect the terminal portions of the stationary rails, whereby to hold all the teeth from engagement with the ground, as specified.

6. In a machine for pulling beets, a wheel-supported frame, a supporting member revolubly mounted in the frame, teeth pivotally carried by the supporting member, auxiliary elevated supports for the teeth at the side portions of the frame, and means for regulating the extent to which the rear teeth shall enter the ground and for holding the said rear teeth in adjusted position, the forward teeth being free to track on the ground, for the purpose described.

7. In a machine for pulling beets, the combination, with a wheel-supported frame, a ring having roller-bearings in the frame, means for operating the said ring from the wheel-support of the frame, and teeth pivotally mounted on the said ring, of segmental rails located at the side portions of the frame and adapted to hold the side teeth from engagement with the ground, auxiliary movable segmental rails located beneath the fixed rails, means for turning the said auxiliary rails, and an adjustable rail having roller-bearings at its under face, adapted for engagement with the upper ends of the teeth, the said adjustable rail being located at the rear of the said frame and above the said frame, as described.

8. In a machine for pulling beets, a horizontally-arranged revoluble support, pivoted teeth mounted in said support, and means for locking the teeth against swinging movement at a predetermined point of movement of the support to cause them to enter the ground, as set forth.

9. In a machine for pulling beets, a horizontally-arranged revoluble support, pivoted teeth carried by the support, and means at the rear of the machine for engaging the teeth to cause them to enter the ground, as set forth.

10. In a machine for pulling beets, a horizontally-arranged revoluble support, teeth movably mounted in the support, means for locking the teeth in position at the rear of the machine to cause them to enter the ground, and means for automatically raising the teeth out of contact with the ground at the sides of the machine, as set forth.

11. In a machine for pulling beets, a horizontally-arranged revoluble support provided with openings, teeth pivoted in said openings, and a rail with which the upper ends of the teeth engage, as and for the purpose set forth.

12. In a machine for pulling beets, a horizontally-arranged revoluble support provided with openings, teeth pivoted in said openings and provided with heads at their upper ends above the support, and an adjustable rail with which the heads of the teeth engage, as set forth.

In testimony whereof I have signed my name to this specification in the presence of two subscribing witnesses.

HIRAM GILBERT HOTCHKISS.

Witnesses:
WM. S. SCOTT,
C. J. COLLINS.